(12) United States Patent
Jamriška et al.

(10) Patent No.: US 9,870,638 B2
(45) Date of Patent: Jan. 16, 2018

(54) APPEARANCE TRANSFER TECHNIQUES

(71) Applicants: Ondrej Jamriška, Prague (CZ); Jakub Fiser, Prague (CZ); Paul J. Asente, Redwood City, CA (US); Jingwan Lu, Santa Clara, CA (US); Elya Shechtman, Seattle, WA (US); Daniel Sýkora, Prague (CZ)

(72) Inventors: Ondrej Jamriška, Prague (CZ); Jakub Fiser, Prague (CZ); Paul J. Asente, Redwood City, CA (US); Jingwan Lu, Santa Clara, CA (US); Elya Shechtman, Seattle, WA (US); Daniel Sýkora, Prague (CZ)

(*) Notice: Subject to any disclaimer, the term of this patent is extended or adjusted under 35 U.S.C. 154(b) by 52 days.

(21) Appl. No.: 15/052,552

(22) Filed: Feb. 24, 2016

(65) Prior Publication Data
US 2017/0243388 A1    Aug. 24, 2017

(51) Int. Cl.
| | |
|---|---|
| G06T 11/60 | (2006.01) |
| G06T 11/00 | (2006.01) |
| G06T 13/80 | (2011.01) |
| G06T 5/50 | (2006.01) |
| G06K 9/46 | (2006.01) |
| G06K 9/62 | (2006.01) |
| G06K 9/00 | (2006.01) |
| G06K 9/68 | (2006.01) |
| H04N 19/39 | (2014.01) |
| H04N 19/27 | (2014.01) |
| H04N 19/53 | (2014.01) |
| G06T 13/60 | (2011.01) |
| G06T 15/04 | (2011.01) |

(52) U.S. Cl.
CPC ............ G06T 13/80 (2013.01); G06T 11/001 (2013.01); G06T 11/60 (2013.01); G06T 13/60 (2013.01); G06T 15/04 (2013.01); *G06T 2210/24* (2013.01)

(58) Field of Classification Search
CPC combination set(s) only.
See application file for complete search history.

(56) References Cited

U.S. PATENT DOCUMENTS

| | | | |
|---|---|---|---|
| 6,064,393 | A | 5/2000 | Lengyel et al. |
| 6,269,175 | B1 | 7/2001 | Hanna et al. |
| 6,487,323 | B1 | 11/2002 | Bonnet et al. |
| 2002/0061066 | A1 | 5/2002 | Persiantsev et al. |

(Continued)

OTHER PUBLICATIONS

Bargteil,"A Texture Synthesis Method for Liquid Animations", In Proceedings of ACM SIGGRAPH/Eurographics Symposium on Computer Animation,, Sep. 2006, pp. 345-351.

(Continued)

*Primary Examiner* — Wesner Sajous
(74) *Attorney, Agent, or Firm* — Wolfe-SBMC

(57) ABSTRACT

Appearance transfer techniques are described in the following. In one example, a search and vote process is configured to select patches from the image exemplar and then search for a location in the target image that is a best fit for the patches. As part of this selection, a patch usage counter may also be employed in an example to ensure that selection of each of the patches from the image exemplar does not vary by more than one, one to another. In another example, transfer of an appearance of a boundary and interiors regions from the image exemplar to a target image is preserved.

20 Claims, 15 Drawing Sheets

(56) References Cited

U.S. PATENT DOCUMENTS

| | | | |
|---|---|---|---|
| 2004/0218830 A1 | 11/2004 | Kang et al. | |
| 2006/0039617 A1 | 2/2006 | Makai et al. | |
| 2008/0238942 A1* | 10/2008 | Sun | G06T 11/60 345/634 |
| 2009/0185747 A1* | 7/2009 | Segall | G06T 9/001 382/220 |
| 2010/0231593 A1 | 9/2010 | Zhou et al. | |
| 2012/0307155 A1 | 12/2012 | Gleicher et al. | |
| 2013/0051685 A1* | 2/2013 | Shechtman | G06T 11/60 382/218 |
| 2014/0313187 A1* | 10/2014 | Cohen | H04N 13/0011 345/419 |
| 2014/0313188 A1* | 10/2014 | Cohen | H04N 13/0011 345/419 |
| 2014/0376807 A1* | 12/2014 | Shechtman | G06T 11/60 382/165 |
| 2015/0071567 A1 | 3/2015 | Mishima et al. | |
| 2015/0097827 A1* | 4/2015 | Cohen | G06T 5/005 345/420 |
| 2016/0142792 A1* | 5/2016 | Lee | G06K 9/6218 725/32 |
| 2016/0191946 A1 | 6/2016 | Zhou et al. | |
| 2017/0061582 A1 | 3/2017 | Lim et al. | |
| 2017/0140514 A1* | 5/2017 | Amirghodsi | G06T 5/50 |
| 2017/0243376 A1 | 8/2017 | Jamriska et al. | |

OTHER PUBLICATIONS

Barnes,"PatchMatch: A Randomized Correspondence Algorithm for Structural Image Editing", ACM SIGGRAPH 2009 Papers (New Orleans, Louisiana, Aug. 3-7, 2009), Aug. 3, 2009, 10 pages.

Barnes,"The Generalized PatchMatch Correspondence Algorithm", European Conference on Computer Vision—Retrieved from <http://gfx.cs.princeton.edu/pubs/Barnes_2010_TGP/generalized_pm.pdf> on Sep. 9, 2010, Sep. 2010, 14 pages.

Benard,"Stylizing animation by example", ACM Transactions on Graphics, Sep. 11, 2013, 12 pages.

Bhat,"Flow-based Video Synthesis and Editing", ACM Transactions on Graphics 23, Aug. 1, 2004, 4 pages.

Bousseau,"Video Water colorization using Bidirectional Texture Advection", ACM Transactions on Graphics, Aug. 5, 2007, 7 pages.

Browning,"Stylized Keyframe Animation of Fluid Simulations", Proceedings of the Workshop on Non-Photorealistic Animation and Rendering,, Aug. 8, 2014, 8 pages.

Chen,"High quality solid texture synthesis using position and index histogram matching", The Visual Computer 26, Sep. 16, 2010, 11 pages.

Darabi,"Image Melding: Combining inconsistent images using patch-based synthesis", ACM Transactions on Graphics (TOG) (Proceedings of SIGGRAPH 2012), 31(4):82:1-82:10, 2012., Jul. 2012, 10 pages.

Han,"Fast Example-based Surface Texture Synthesis via Discrete Optimization", The Visual Computer 22, 9-11, Aug. 26, 2006, 7 pages.

Hertzmann,"Image Analogies", Proceedings of SIGGRAPH 2001, 2001, 14 pages.

Kaspar,"Self Tuning Texture Optimization", Computer Graphics Forum 34, 2, Jun. 22, 2015, 11 pages.

Kopf,"Solid Texture Synthesis from 2D Exemplars", ACM Transactions on Graphics 26, 3, 2, Aug. 5, 2007, 9 pages.

Kwatra,"Graphcut Textures: Image and Video Synthesis Using Graph Cuts", ACM Trans. Graph. 22 (2003), 3, 2003, 10 pages.

Kwatra,"Texture Optimization for Example-based Synthesis", Retrieved from <http://physbam.stanford.edu/~kwatra/papers/TO/TO-final.pdf> on Nov. 28, 2012, 2005, 8 pages.

Kwatra,"Texturing Fluids", Submitted to IEEE Transactions on Visualization and Computer Graphics, Jun. 2006, 14 pages.

Lefebvre,"Appearance-space texture synthesis", ACM Transactions on Graphics 25, 3, Jul. 30, 2006, 8 pages.

Liao,"Automated Video Looping with Progressive Dynamism", ACM Transactions on Graphics (Proc. SIGGRAPH), Jul. 2013, 10 pages.

Narain,"Feature-Guided Dynamic Texture Synthesis on Continuous Flows", In Proceedings of Eurographics Symposium on Rendering, Jun. 25, 2007, 10 pages.

Newson,"Video Inpainting of Complex Scenes", SIAM Journal of Imaging Science 7, 4, Mar. 18, 2015, 27 pages.

Neyret,"Advected Textures", Eurographics Symposium on Computer Animation, Nov. 18, 2010, 8 pages.

Perlin,"An Image Synthesizer", Computer Graphics, vol. 19, No. 3, Jul. 1985, pp. 287-296.

Reeves,"Particle Systems a Technique for Modeling a Class of Fuzzy Objects", ACM Transactions on Graphics 2, 2, Apr. 1983, pp. 91-108.

Rosenberger,"Layered Shape Synthesis: Automatic Generation of Control Maps for Non-Stationary Textures", ACM Transactions on Graphics, vol. 28, No. 5, Article 107, Dec. 2009, 10 pages.

Schodl,"Video Textures", In ACM Transactions on Graphics (Proc. SIGGRAPH), 2000, 10 pages.

Shechtman,"Regenerative Morphing", CVPR, 2010, 8 pages.

Simakov,"Summarizing Visual Data Using Bidirectional Similarity", In Proceedings of CVPR 2008, Jun. 23, 2008, 8 pages.

Stam,"Stable Fluids", SIGGRAPH '99 Conference Proceedings, ACM Press, New York, NY, Aug. 1999, 8 pages.

Wei,"Inverse Texture Synthesis", ACM Trans. Graph 27, 3, 2008, 10 pages.

Wexler,"Space-Time Video Completion", IEEE Transactions on Pattern Analysis and Machine Intelligence 29, 3,, Mar. 1, 2007, 8 pages.

Yu,"Lagrangian Texture Advection: Preserving both Spectrum and Velocity Field", IEEE Transactions on Visualization and Computer Graphics 17, 11, Dec. 2010, pp. 1612-1623.

"Notice of Allowance", U.S. Appl. No. 15/052,710, dated Aug. 7, 2017, 10 pages.

"Pre-Interview Communication", U.S. Appl. No. 15/052,710, dated Jun. 26, 2017, 3 pages.

* cited by examiner

1402
Synthesize frames in a target video using frames in a video exemplar

1404
Warp a previous frame of the target video that occurs in a sequence of the target video before a particular frame being synthesized

1406
Synthesize texture in the particular frame of the target video, the synthesizing including synthesizing color in the particular said frame from a corresponding frame of the video exemplar as guided by a flow indicated in the warped previous frame of the target video

*Fig. 14*

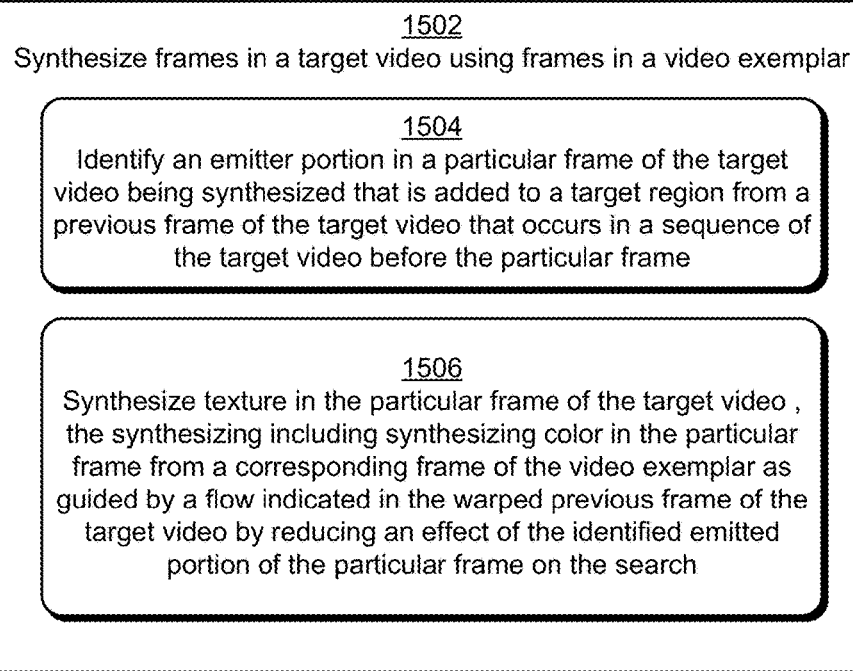
Fig. 15

APPEARANCE TRANSFER TECHNIQUES

BACKGROUND

Special effects based on fluid elements have become increasingly more common as part of animations, digital movie production, and other types of digital content. An artist, for instance, may use fluid elements as part of animation to create an appearance of a dragon breathing fire. Other examples of fluid elements include smoke rising from a fire, water flowing over a cliff, a lava flow from a volcano, and so forth.

In conventional techniques, the artist typically formed a video out of pre-captured videos of fluids in real life having a desired appearance, e.g., a running stream, a campfire, and so forth. A limitation with this technique, however, is that the motion properties of these videos remain fixed to follow a motion and appearance of fluid elements in the video and thus cannot deviate, readily, from this motion or appearance. Accordingly, when finer control is desired by the user to deviate from these fixed motion properties, the artist is forced in conventional techniques to resort to full fluid simulation in which motion and appearance characteristics are specified manually by a user. This is conventionally followed by an advanced rendering algorithm that requires detailed knowledge on the part of the artist in order to obtain a realistic appearance of a fluid, e.g., fire. Additionally, limitations involving resolution, complexity of material properties, lighting, or other parameters may hinder achievement of this realistic appearance. Even in instances in which the artist has this detailed knowledge, achievement is still hindered because of the complexity of transferring the ever changing characteristics that make up the ever changing appearance of the fluid.

SUMMARY

Appearance transfer techniques are described in the following. These techniques are usable to generate realistic looking target images from image exemplar, including fluid animations, by transferring an appearance of the image exemplar to the target image. In one example, a search and vote process is configured to select patches from the image exemplar and then search for a location in the target image that is a best fit for the patches, which is the opposite order of conventional techniques. As part of this selection, a patch usage counter may also be employed in an example to ensure that selection of each of the patches from the image exemplar does not vary by more than one, one to another. Through use of the patch usage counter, selection is ensured of dynamic patches and thus maintains a dynamic appearance of the animation.

In another example, transfer of an appearance of a boundary from the image exemplar to a target image is preserved. This is achieved by differentiating between boundary and interior portions of the image exemplar and boundary and interior portions of the target image. In this way, boundary portions such as an edge of a flame are maintained to provide a realistic looking appearance.

In yet another example, temporal coherence is preserved between frames in a target video in a manner that avoids the jerking and pulsing of conventional techniques caused by noticeable differences in successive frames in the conventional techniques. In order to do so, a previous frame of a target video is warped that occurs in the sequence of the target video before a particular frame being synthesized to define motion, e.g., using a motion field output of a fluid simulator to give an appearance of motion. Color of the particular frame is transferred from an appearance of a corresponding frame of a video exemplar. In this way, smooth changes may be observed between successive frames while maintaining a dynamic appearance within the frames.

In a further example, emitter portions are identified (e.g., portions having "new fluid" in subsequent frames) and addressed to preserve temporal coherence. For example, an emitter portion may involve portions in frames that include "new fluid" when compared with a previous flame, such as may be observed by an animation of an expanding fireball. By identifying these portions, an effect of these portions of generation of the animation may be addressed to reduce an influence of the emitter portion of the target region in the selection of patches and thus maintain a dynamic appearance of the animation.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 14 is a flow diagram depicting a procedure in an example implementation to synthesize texture in a particular frame of the target video.

FIG. 15 is a flow diagram depicting a procedure in an example implementation of a patch match process to synthesize a texture as part of appearance transfer.

DETAILED DESCRIPTION

Overview

Figure 1:
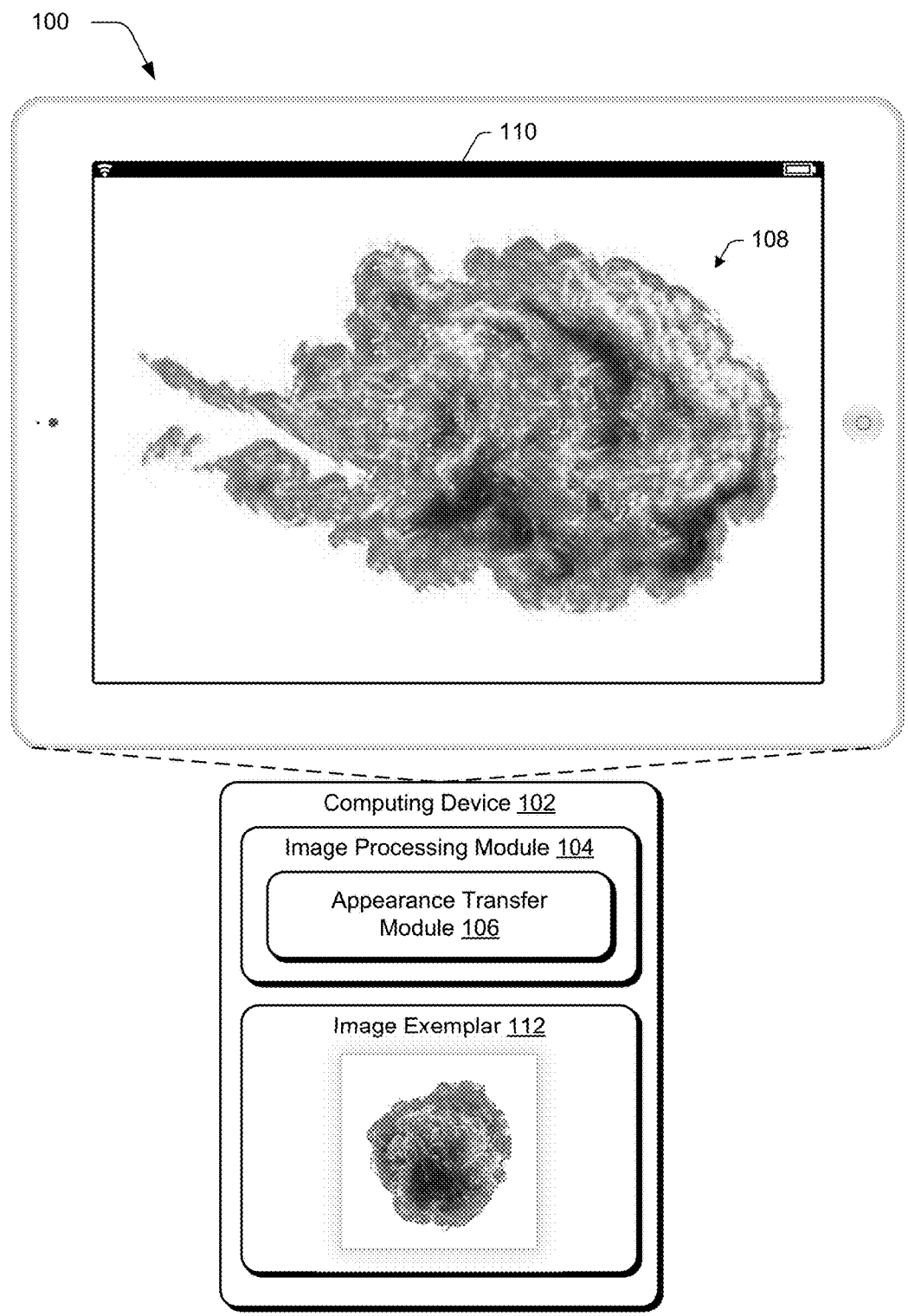
FIG. 1 is an illustration of an environment in an example implementation that is operable to employ appearance transfer techniques described herein.

Conventional techniques that are used to generate fluid animations involve transfer of an appearance from an image exemplar to frames of the animation. For example, an image exemplar of a flame is used to transfer an appearance of the flame to form an animation of a dragon breathing fire. However, these techniques in practice typically result in an animation becoming "washed out" as the animation progresses due to decreasing richness in the display of the fluid due to limitations of conventional transfer techniques that bias transfer of parts of the image exemplar that exhibit less variation. These conventional techniques also result in temporal artifacts that are viewed as blocky and jerking motion from one frame to another due to lack of temporal coherence between the frames.

Appearance transfer techniques are described in the following. These techniques are usable to generate realistic looking target images from image exemplar by transferring an appearance of the image exemplar to the target image. The target image may also be included as one of a series of frames in order to generate an animation. A variety of techniques are described in the following to support appearance transfer that overcome the difficulties in conventional fluid animation techniques described above.

In one example, a search and vote process is configured to select patches from the image exemplar and then search for a location in the target image that is a best fit for the patches. A voting process is performed to arrive at a final color value (e.g., red, green, blue) for pixels in the target image from patches that overlap the pixel. In this example, the search is performed in a direction that is opposite to conventional techniques that involve selection of a patch of the target image and then a best match is found in the image exemplar. In this way, usage of patches that have increased entropy (e.g., exhibit dynamic content and appearance of motion) is encouraged. This order of selection from the image exemplar and then search for the location in the target image also mitigates against selection of low entropy patches as typically resulting from conventional techniques that cause the animation to become progressively "washed out" as the influence of the patches increases in successive frames.

As part of this selection, a patch usage counter may also be employed to ensure that selection of each of the patches from the image exemplar does not vary by more than one, one to another. In other words, this ensures that none of the patches of the image exemplar are used more than one time over any other patch of the image exemplar to transfer appearance to a target region. For a target image that has room for more patches than a number of patches in an image exemplar, for instance, this ensures that each of the patches are used at least once in the target image. This also ensures that no patch is used more than one time as compared with usage of any other patches from the image exemplar. In this way, equalized usage of patches from the image exemplar is ensured that preserves transfer of an appearance of the image and avoids wash out by maintaining a dynamic appearance of the image exemplar.

In another example, transfer of an appearance of a boundary from the image exemplar to a target image is preserved. This is achieved by differentiating between boundary and interior portions of the image exemplar and boundary and interior portions of the target image. In this way, patches from the boundary portion of the image exemplar are used to transfer appearance to the boundary portion of the target image and patches from the interior portion of the image example are used to transfer appearance to the interior portion of the target image.

In yet another example, temporal coherence is preserved between frames in a target video in a manner that avoids the jerking and pulsing of conventional techniques that did not enforce consistency between frames of the video. In order to do so, a previous frame of a target video is warped that occurs in the sequence of the target video before a particular frame being synthesized, e.g., through use of a motion field. This warping is used to guide a flow of motion from the previous frame to the particular frame. Color of the particular frame is transferred from an appearance of a corresponding frame of a video exemplar. In this way, motion remains consistent between the frames with rich color taken from a corresponding frame of the video exemplar and thus addresses changes observed between frames in the video exemplar.

In a further example, emitter portions are identified and addressed to preserve temporal coherence. For instance, successive frames of a target region in a target video may expand, such as to show an expanding fireball. Thus, these successive frames may include areas in the target region that did not exist in the previous frame. Accordingly, techniques are described to identify these emitter portions and react accordingly, such as to reduce an influence of the emitter portion of the target region in the selection of patches. This acts to avoid influence of these "empty" pixels and resulting washout on selection of patches as exhibited by conventional techniques. Other examples are also contemplated, further discussion of which is included in the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes a computing device 102, which may be configured in a variety of ways. The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 16.

The computing device 102 is illustrated as including an image processing module 104. The image processing module 104 is implemented at least partially in hardware (e.g., processor and memory, integrated circuit, fixed logic, and so forth) to transform images, whether single images or multiple images arranged as frames of a video. This includes creation of images as well as modification of existing images to arrive at the transformed image.

An example of this functionality is illustrated as an appearance transfer module 106. The appearance transfer module 106 is implemented at least partially in hardware (e.g., processor and memory, integrated circuit, fixed logic, and so forth) to form a target image 108 as illustrated on the display device 110 of the computing device 102 from an image exemplar 112. The image exemplar 112, for instance, acts as a source of texture for the target image 108, including color and structure, that is transferred to the target image 108 and thus is also referred to as a "source" in the following. In this way, appearance of the image exemplar 112 is transferred to the target image 108, further discussion of which is included in the following and shown in corresponding figures.

In the following sections, use of a search order as part of a search and vote patch matching technique is first described that preserves use of patches. A section follows that describes implement of a patch usage counter to enforce strict patch usage of each of the patches within one, of each other. Another section follows that describes techniques to preserve boundary effects as a part of appearance transfer. Temporal coherence and use of video exemplars is then described which involves use of a previously synthesized frame in a target video to guide motion and use of a corresponding frame from a video exemplar for color. A section follows that addresses emitter portions (e.g., portions having newly added fluid as part of the animation) as part of temporal coherence. Joint usage of these techniques is then described.

Search Order as Part of a Search and Vote Patch Matching Technique

Figure 2:
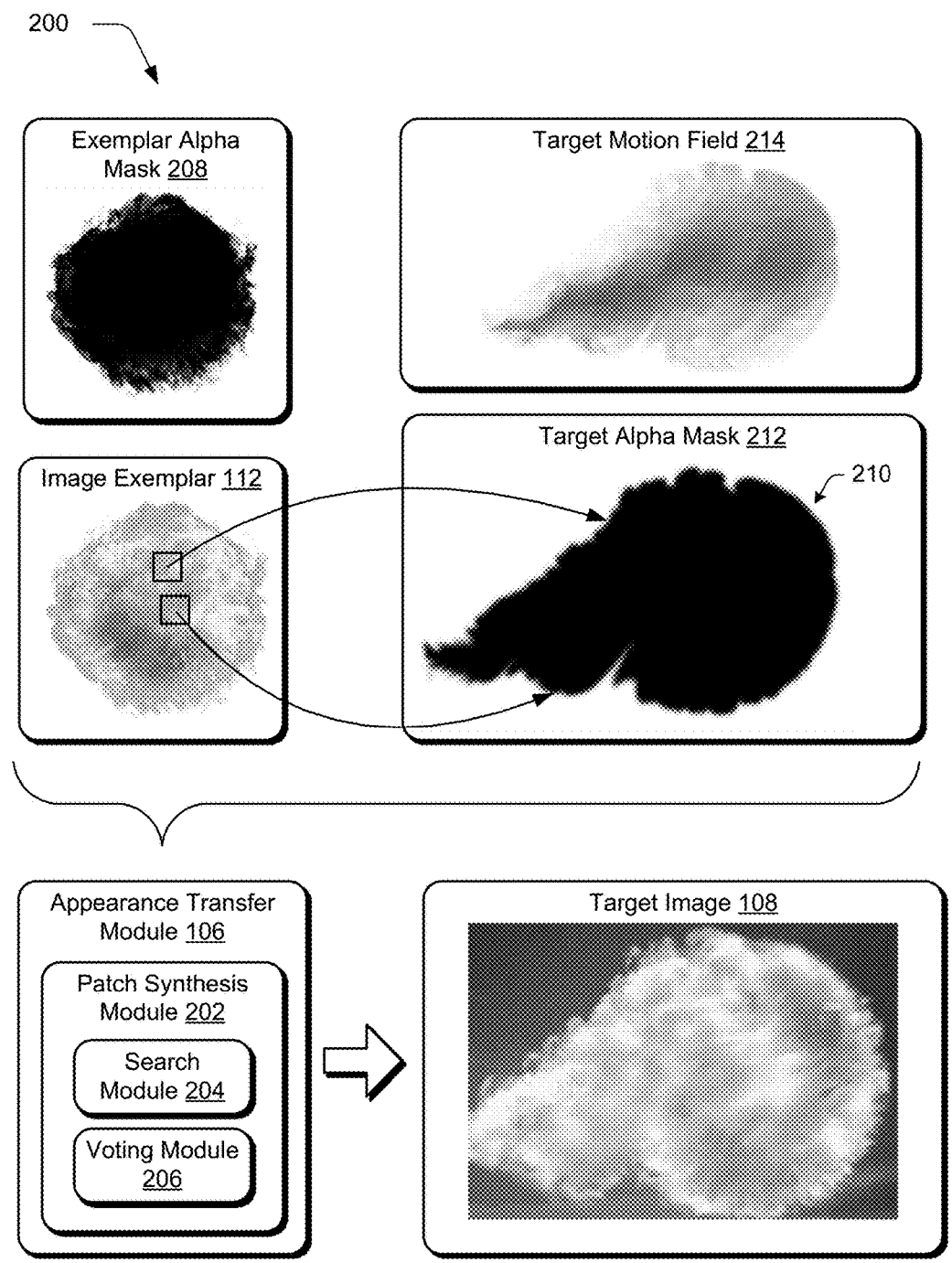
FIG. 2 depicts a system in an example implementation showing an appearance transfer module of FIG. 1 in greater detail.

FIG. 2 depicts a system 200 in an example implementation showing the appearance transfer module 106 in greater detail as performing a search and vote process in which patches are selected from the image exemplar 112 and then locations are found to include the patches in a target image 108. The appearance transfer module 106 in this example is configured to transfer the appearance through use of a patch synthesis module 202. The patch synthesis module 202 is implemented at least partially in hardware (e.g., processor and memory, integrated circuit, fixed logic, and so forth) to perform a patch matching technique to synthesize texture using a search a vote process, functionality of which is represented by a search module 204 and a voting module 206, respectively.

In a patch matching technique, correspondence between typically small regions (e.g., patches having rectangular or other shapes) of an image are found to transfer appearance from one region to another, such as between a region of an image exemplar 122 defined by an exemplar alpha mask 208 to a target region 210 as defined by a target alpha mask 212. The exemplar alpha mask 208, for instance, may define a portion of the image exemplar 122 that is to be used as a source for the appearance and the target region 210 defines a portion of the target image 108 that is to be synthesized to include this appearance.

In the illustrated example, a grayscale depiction is used for the exemplar alpha mask 208 and the target alpha mask 212 to indicate corresponding levels of transparency, e.g., white for zero transparency and black for completely transparent. As illustrated, for instance, the exemplar alpha mask 208 defines a portion of the image exemplar 112 this includes a ball of flame. This portion is to be used as a basis to synthesize texture to a target region 210 to form an expanding jet of flame, e.g., as if breathed by a dragon.

In conventional patch matching techniques, a search process is performed in which a patch is selected from the target region 210 and then a "best fit" patch is located in the image exemplar 112. This process is repeated as part of a search process until a series of overlapping patches are obtained for each pixel. A voting process is then performed by the voting module 206 to define a relative contribution each of the overlapping pixels is to have (e.g., a weighting) on a final color value for that pixel.

Although this conventional technique has worked well for static images, this technique has not exhibited realistic results when confronted with animations, especially those that are to exhibit fluid dynamics, e.g., smoke, fire, lava, water, and so forth as previously described. This is because as the conventional process continues to synthesize successive frames of an animation, the conventional patch match technique tends to prefer patches having lower entropy, e.g., exhibit less dynamics in movement and colors. This causes conventional patch match techniques to form animations that "wash out" over time as the influence of these lower entropy patches takes over the synthesis of the appearance for subsequent frames in the animation.

There are a variety of techniques described in the following that are configured to address this problem. In the current example, an order in which the search is performed by the search module 204 is reversed when compared to conventional techniques. For instance, a search module 204 first selects a patch from the image exemplar 112 and then performs a search to find a best location for that patch in the target region 210 of the target image 108. In this way, use of patches from the image exemplar 112 that have relatively high levels of entropy is ensured.

The patch synthesis module 202 receives a variety of inputs in order to perform the appearance transfer. As described above, the inputs include an image exemplar 112 that acts as an exemplar of a fluid element Z that can be a single RGBA image or a sequence of M RGBA images $(Z^t)_{t=1}^{M}$, i.e., a video exemplar as described in the following. The appearance transfer module 106 may also receive a target alpha mask 212 to generate a static image or a sequence of N target alpha masks $(X_a^t)_{t=1}^{N}$ (gray-scale images) with corresponding target motion fields 214, (e.g., 2D motion fields $(F^t)_{t=1}^{N}$) in order to generate an animation. Source Z represents a desired appearance, $X_a$ captures the shape, and F captures the motion of the target fluid animation. The patch synthesis module 202 transfers the appearance from fluid element Z to target X in a way that the resulting visual content moves along with F, is coherent in time, and respects boundary-specific effects prescribed by $X_a$ and $Z_a$ (the alpha channel of Z) as described in the following sections.

Patch Usage Counter

Figure 3:
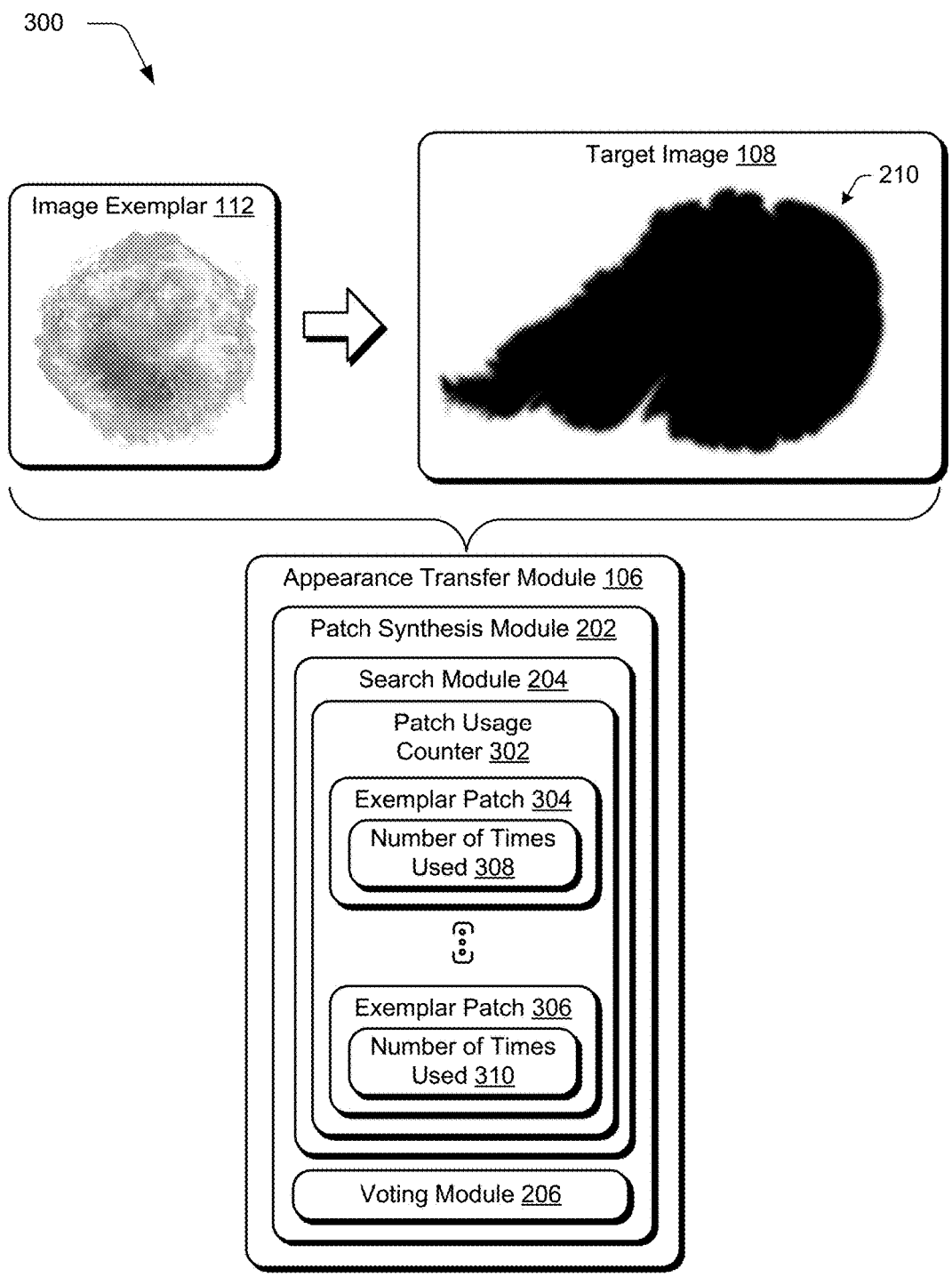
FIG. 3 depicts a system in an example implementation showing an appearance transfer module of FIG. 1 in greater detail as performing a search and vote process in association with a patch usage counter.

FIG. 3 depicts a system 300 in an example implementation showing the appearance transfer module 106 in greater detail as performing a search and vote process. As part of the search, patches are selected from the image exemplar 112 based at least in part on a patch usage counter 302 in order to enforce uniformity of patch usage from the image exemplar 112. The patch usage counter 302 describes exemplar patches 304, 306 available from the image exemplar 112 and a number of times 308, 310 the respective patches are used as part of transfer of the appearance from the image exemplar 112 to the target region 210 of the target image 108.

Figure 4:
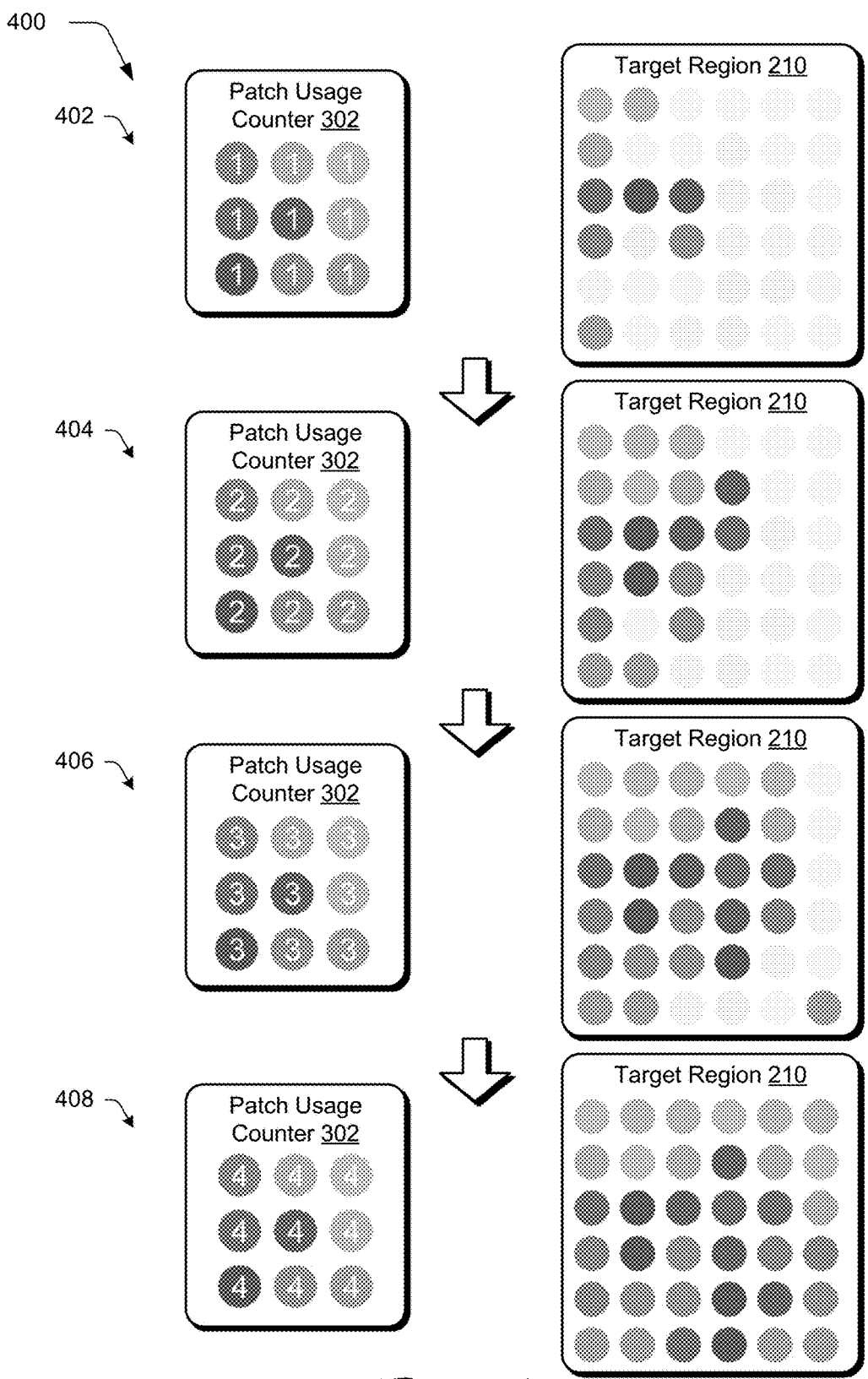
FIG. 4 depicts an example implementation of use of the patch usage counter to guide a search performed by a search module of FIG. 2.

FIG. 4 depicts an example implementation 400 of use of the patch usage counter 302 to guide a search performed by the search module 204 of FIG. 2. This implementation 400 is illustrated using first, second, third, and fourth stages 402, 404, 406, 408. At the first stage 402, patches are selected from the image exemplar 112 of FIG. 1 and locations for the patches are found in the target region 210 as illustrated. Usage of the patches is monitored and stored in the patch usage counter 302 as illustrated for each patch by the search module 204 of FIG. 2.

This process continues for the second, third, and fourth stages 404, 406, 408 such that usage of one of the patches does not deviate from usage of the other patches by more than one. In this way, the search module 204 may employ the patch usage counter 302 to determine which patches are available for selection and further may build on the previous technique of selecting patches from the image exemplar 112 for inclusion in the target region 210.

Mathematically, this uniformity of patch usage may be strictly enforced through use of a uniformity constraint. For example, the search module 204 may be configured to select patches through minimization of the following energy:

$$E(Z, X^t, \hat{X}^{t-1}) = E_s(Z, X^t) + \lambda E_t(X^t, \hat{X}^{t-1})$$

where $X^t$ is the currently synthesized frame and $\hat{X}^{t-1}$ is the previously synthesized frame, forward-warped using motion field $F^{t-1}$.

The energy (1) contains two terms:
Source Coherence:

$$E_S(Z, X^t) = \sum_{p \in X^t} \min_{q \in Z} \|x_p^t - z_q\|^2$$

This ensures the appearance of the target animation frame $X^t$ is similar to the exemplar Z. Here $z_q$ and $x_p^t$ denote source and target patches centered at pixels $p \in X^t$ and $q \in Z$ respectively.
Temporal Coherence:

$$E_t(X^t, \hat{X}^{t-1}) = \sum_{p \in X^t} \|X^t(p) - \hat{X}^{t-1}(p)\|^2$$

This ensures the resulting fluid animation changes smoothly in time and moves along with F. Here $X^t(p)$ denotes color at a pixel $p \in X^t$.

To fully avoid a preference for particular patches that leads to appearance degradation (i.e., wash out), uniformity of patch usage is strictly enforced by minimizing the energy equation above subject to an additional uniformity constraint:

$$\sum_{p \in Z} \delta(p) = |X| \text{ and } \delta(p) - K \in \{0, 1\}$$

where $\delta(p)$ counts the usage of a source patch $z_p$ centered at a pixel $p \in Z$ and K is the floor of the ratio between the number of target |X| and source |Z| patches, i.e., $K = \lfloor |X|/|Z| \rfloor$.

As previously described, a modification is made to a search and vote technique to ensure uniform patch usage, which may be implemented in the following as part of computation of a nearest-neighbor field. This modification results in reversal of a direction in which NNF retrieval is performed such that for each source patch $z_p$, $p \in Z$ a target patch $x_q$ is found that has minimal distance: $D(z_p, x_q) = \|z_p - x_q\|^2$.

Since this search is performed independently for patches from the image exemplar 112 (i.e., the source in the following), instances may occur in which two source patches identify the same target patch as a corresponding nearest neighbor. This collision may be resolved by keeping the correspondence with the smaller patch distance. Moreover, since the number of patches in Z (i.e., the image exemplar 112) is usually smaller than the number in X (i.e., the target region 210) the NNF retrieval is repeated by the search module 204 until each of the patches in X have been assigned their counterparts in Z.

Figure 5:
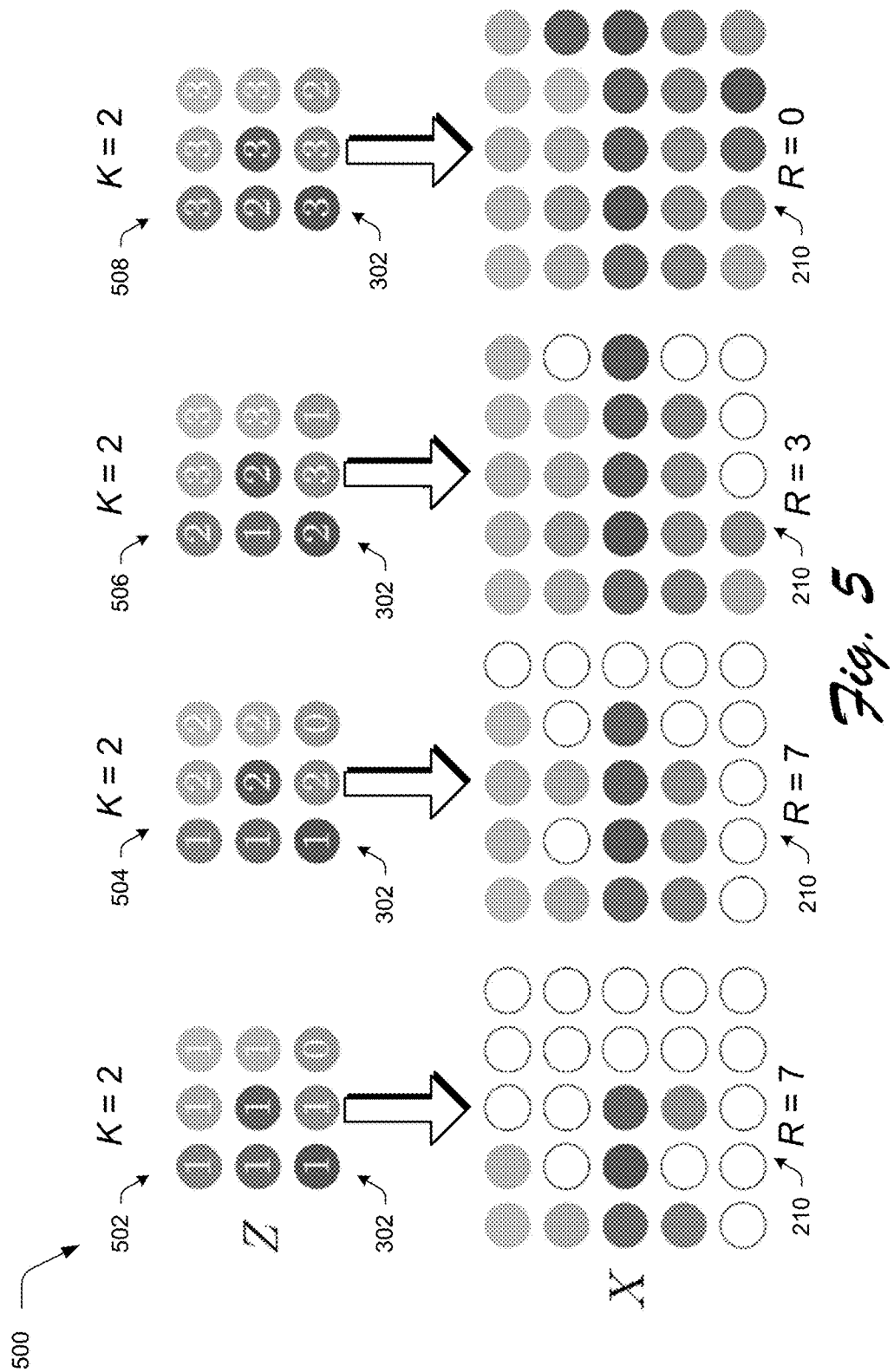
FIG. 5 depicts an example implementation in which another example is described to ensure uniform patch usage.

FIG. 5 depicts an example implementation 500 in which another example is described to ensure uniform patch usage, which is illustrated using first, second, third, and fourth stages 502, 504, 506 508. In this example, like above, a patch usage counter $c_p$ 302 is initially set to zero and then gradually incremented whenever $z_p$ is assigned to $x_q$ to ensure that each patch in the image exemplar Z 112 is used uniformly in the target region X 210. Nearest neighbor retrieval is performed by the search module 204 only between patches $z_p$ with $c_p < K$ and yet unassigned patches in X, e.g., the empty circles in FIG. 5.

When |X| is not divisible by |Z|, i.e., when there is a non-zero remainder $R = |X| \mod |Z|$, the situation becomes more complex. In this example, all patches equally participate during the NNF retrieval phase.

During the repeated retrieval, an original limitation that only patches with $c_p < K$ can be considered for assignment is eased by the search module 204 to also allow patches with $c_p = K$ since some of these patches are used to even up a non-zero R. The list of nearest neighbors candidates $(z_p, x_q)$ are then sorted in order of increasing $D(z_p, x_q)$, supposing each of the colliding pairs have been removed. In this order, the following operations are performed for each nearest neighbor candidate $(z_p, x_q)$:
  if $c_p < K$ then
    assign $z_p$ to $x_q$ and increment $c_p$
  else if $c_p = K$ and $R > 0$ then
    assign $z_p$ to $x_q$, increment $c_p$ and decrement R.

As illustrated, for instance, for all patches in the source Z (i.e., the image exemplar 112), the best matching candidates in the target region X 210 are found. Since $|Z| < |x|$ and some nearest neighbor candidates can collide with other the retrieval is repeated until each of the patches from X (i.e., the image exemplar 112) have been assigned to corresponding patches in Z, i.e., the target region 210. Patch counters $c_p$, quotient $K = \lfloor |X|/|Z| \rfloor$, and remainder $R = |X| \mod |Z|$ ensure uniformity of patch usage from the image exemplar 112, i.e., the source.

Boundary Effects

The techniques described in the previous sections assume that each of the patches from the source are used equally (within one) in the target. In this scenario, a distinction is also made between the boundaries (B) and interiors (I) of fluid elements to preserve differences in respective appearance, e.g., tips of the flame versus interior portions of a fireball, as part of appearance transfer.

Figure 6:
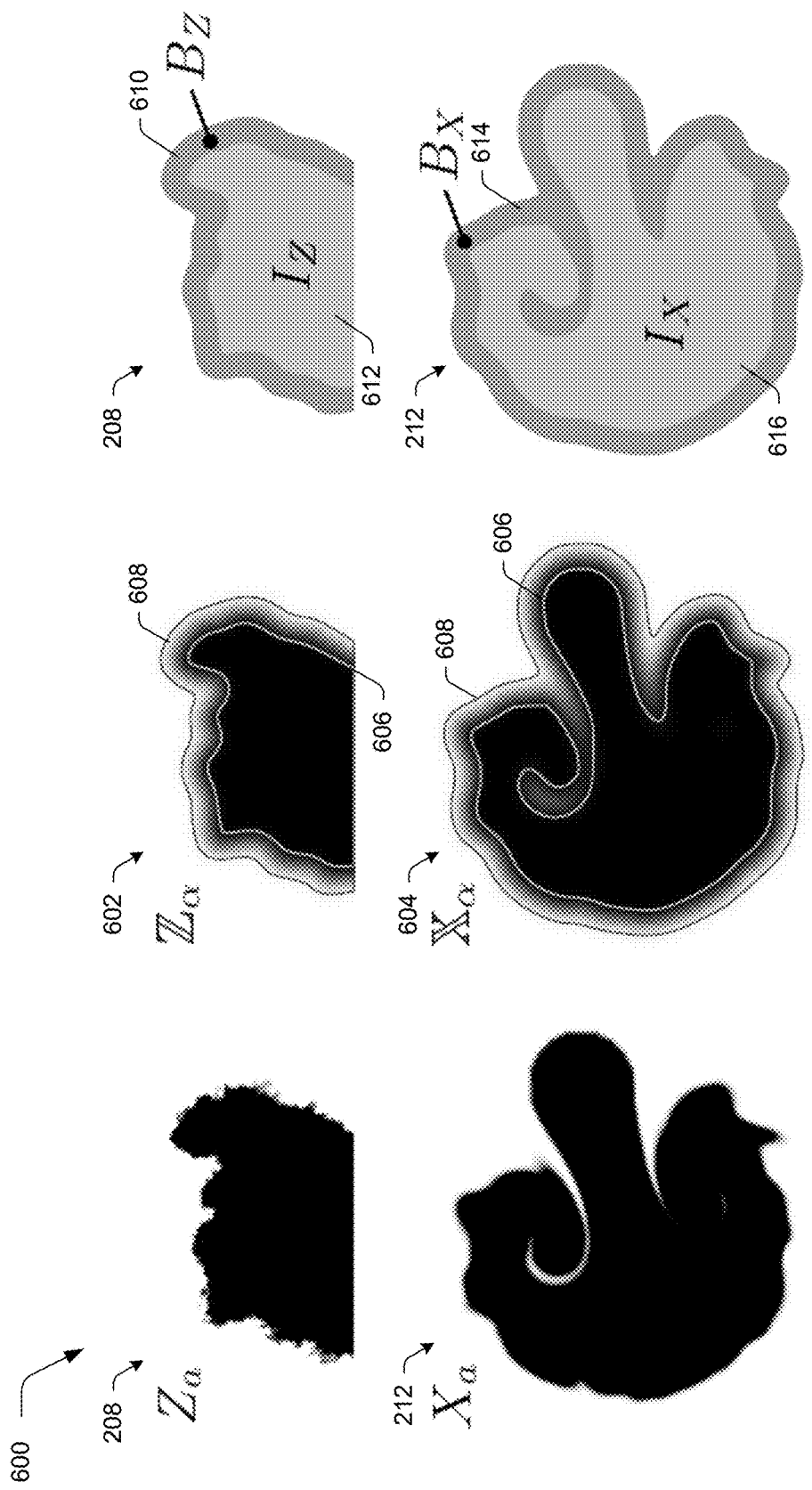
FIG. 6 depicts an example implementation in which interior and boundary portions of image exemplars and target regions are constructed.

FIG. 6 depicts an example implementation 600 in which interior and boundary portions of image exemplars 112 and target regions 210 are constructed. To construct interior portions I and boundary portions B, for the image exemplars 112 and target regions 210, respectively, the corresponding exemplar and target alpha masks 208, 212 ($Z_a \to \mathbb{Z}_\alpha$ and $X_a \to \mathbb{X}_\alpha$) are blurred to form respective blurred exemplar and target alpha masks 602, 604. Blurring may be performed in a variety of ways, such as by using Gaussian blur with radius r.

Lower l 606 and upper u 608 opacity thresholds are applied. For the exemplar alpha mask 208 for the image exemplar 112 Z (i.e., the source) this yields a border portion 610 $B_Z: \mathbb{Z}_\alpha \epsilon (l, u)$ and an interior portion 612 $l_Z: \mathbb{Z} \geq u$. Likewise, for the target alpha mask 212 this also yields a border portion $B_x$ 614 and an interior portion $I_x$ 616. Portioning of the exemplar and target alpha masks 208, 212 permits the NNF retrieval to be restricted so that patches from the border portion 610 of the image exemplar 112 are matched to those from the border portion 614 of the target region 210. Likewise, patches from the interior portion 612 of the image exemplar 112 are matched to those from the interior portion 616 of the target region 616. Mathematically, to enforce uniformity in each segment, $K=|I_x|/|I_Z|$ and $R=|I_x|$ mod $|I_Z|$ is set for all patches in $I_Z$ and $K=|B_x|/|B_Z|$ and $R=|B_x|$ mod $|B_Z|$ for all patches in $B_Z$.

In one or more implementations, $Z_a$ and $X_a$ (i.e., exemplar and target alpha masks 208, 212) are implemented as additional pixel channels to enable the synthesis of a detailed alpha mask for the target. During each iteration of the search process, a pixel channel corresponding to the target alpha mask $X_a$ is modified along with the regular color channels $X_r$, $X_g$, and $X_b$. To increase the influence of these additional channels when computing the pixel difference, the weight of the additional pixel channels is set to be three times higher than the individual color channels, although other weights are also contemplated.

For some exemplars a simple distinction between a boundary and interior might not be sufficient since patches from the outer part of the boundary can still be assigned to the inner part and vice versa. To alleviate this confusion, blurred alpha masks $\mathbb{Z}_\alpha$ and $\mathbb{X}_\alpha$ may also be added as additional pixel channels, in which $\mathbb{X}_\alpha$ stays fixed during the synthesis and biases the NNF retrieval so that patches closer to the transition $B_Z \leftrightarrow I_Z$ in the source are more likely to be mapped to the target transition $B_X \leftrightarrow I_X$ and vice versa. A user may control this bias by adding a special weighting parameter η, with lower η implementing greater variability in the synthesized boundary effects.

Temporal Coherence and Video Exemplars

Temporal coherence refers to similarity in a flow of motion between frames of an animation to promote realism and thus avoid artifacts such as jerking motion, jitters, and so forth that are readily viewable by a user. Conventional techniques to ensure temporal coherence iteratively blend a currently synthesized frame with a forward-warped version of the previously synthesized frame $\hat{X}^{t-1}$. Unfortunately, this conventional approach works only for static sources since it enforces similarity only to the previously synthesized frame and thus three or more such frames, when viewed in succession, may have significantly different synthesis results that are readily viewable by a user.

Figure 7:
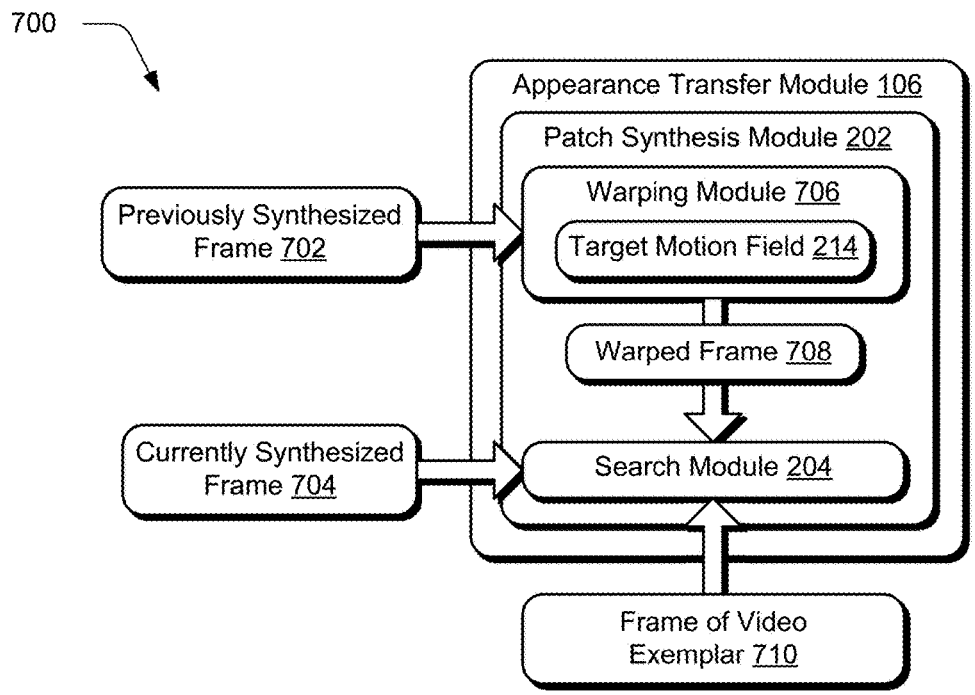
FIG. 7 depicts an example implementation in which an appearance transfer module is configured to employ a video exemplar having a plurality of frames.

FIG. 7 depicts an example implementation in which the appearance transfer module 106 is configured to employ a video exemplar having a plurality of frames, e.g., to show motion of a fluid within the frames such as a fireball expanding, flowing water, and so forth. Thus, each of the frames of the video exemplar may act as the image exemplar 112 in the previous examples as a source to transfer appearance to target images that are included as frames in a target animation. In order to do so, however, temporal coherence is also maintained such that the target frames, when viewed in succession, exhibit plausible and realistic views of a fluid or other object being animation.

For example, the patch synthesis module 202 in this example first obtains a previously synthesized frame 702 that is positioned before a currently synthesized frame 704 for output in succession as part of an animation. The previously synthesized frame 702 is warped by a warping module 706 (e.g., through use of the target motion field 214) to form a warped frame that is to serve as a guide regarding motion to be exhibited by the currently synthesized frame 704. The warping, for instance, may be performed using a motion field that is an output of a fluid simulator. In this field each target pixel has assigned coordinates in a previous frame which forma a motion vector that is then used to warp the frame. Since the previous frame is a grid and the motion vector is usually expressed using two floating point number, bilinear interpolation may be used to mix the colors of nearby pixels. A corresponding frame of a video exemplar 710 is used as a basis to provide color for the currently synthesized frame 704. Thus, in this way, the search module 204 is configured to search for patches that are independently similar to the source, both in the forward-warped version of the previously synthesized frame 702 (i.e., the warped frame 708) and the currently synthesized frame 704.

This approach may be implemented by the search module 204 in a manner similar to the boundary effect above, i.e., through inclusion of additional channels. In this example, the video exemplars $(Z^t)_{t=1}^M$ are used such that successive frames of the video exemplar act as the previous image exemplars. To do so, four additional RGBA channels are introduced into the source $Z^t(p)$ and target $X^t(q)$ pixels that contain values from collocated pixels in previous frames $Z^{t-1}(p)$ and $\hat{X}^{t-1}(q)$. The additional RGBA channels influence the overall patch similarity and thus bias the NNF retrieval performed by the search module 204 to prefer source patches whose appearance is close to both the current and the forward-warped previous frame. For a static image exemplar 112, the content of the regular RGBA channel is duplicated. Further discussion of synthesis of a target video using a exemplar video is described in relation to FIG. 15 in the following.

Temporal Coherence and Emitters

Figure 8:
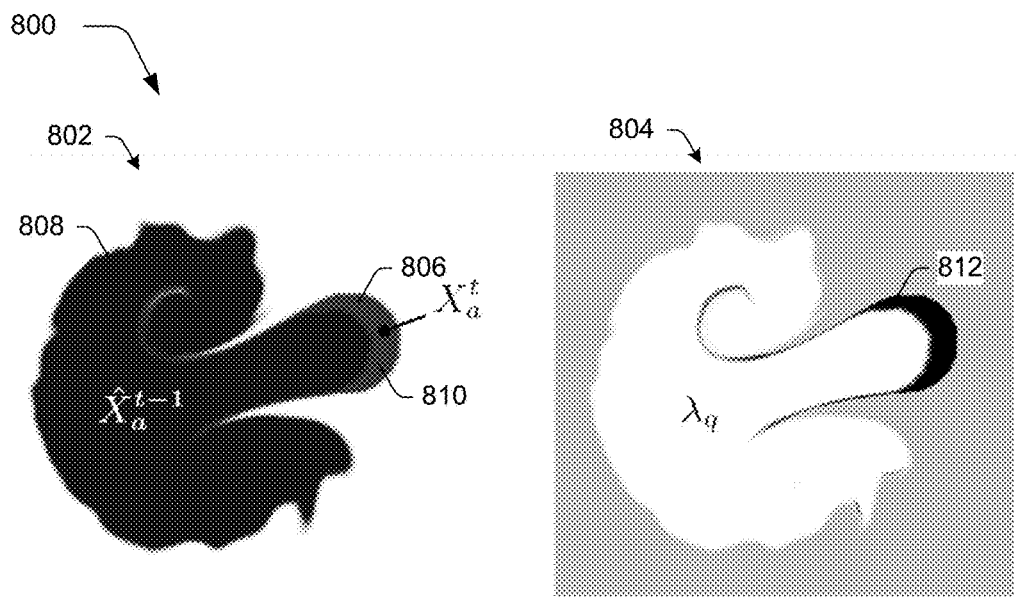
FIG. 8 depicts an example implementation in which an emitter portion is identified as part of appearance transfer.

FIG. 8 depicts an example implementation 800 in which an emitter is identified as part of appearance transfer. Emitters refer to portions of target region being synthesized in a current frame that is added from a previously synthesized frame. A target video, for instance, may include successive frames showing an expanding fireball. Accordingly, portions of the fireball added in the successive frames is referred to as emitters. When synthesizing a target video, however, these emitters where the new fluid is spawned would incorporate the surround empty pixels as part of a forward-warping mechanism and thus would "wash out" those areas.

Accordingly, in this example the patch synthesis module 202 is configured to identify these emitters and react accordingly. The example implementation 800 of FIG. 8 is illustrated using first and second stages 802, 804. At the first stage 802, the emitter is deducted from the current frame mask $X_a^t$ 806 and the forward-warped mask of the previous frame $\hat{X}_a^{t-1}$ 808 using the following equation:

$$\lambda_q = (1 - \max(0, X_a^t(q) - \hat{X}_a^{t-1}(q)))\lambda.$$

In this way, an emitter 812 is identified where the new fluid is spawned from the previous frame.

At the second stage 804, the patch synthesis module 202 then creates an alpha mask $\lambda_q$ in which an alpha value $\lambda$ for pixels where fluid exists in both the previous and current frames is maintained, and set to zero for pixels in the emitter portion 812, i.e., where the new fluid appears. In this way, an influence of the emitter 812 on the search process is reduced and even eliminated, further discussion of which is described in relation to FIG. 16 in the following.

Joint Formulation

Figure 9:
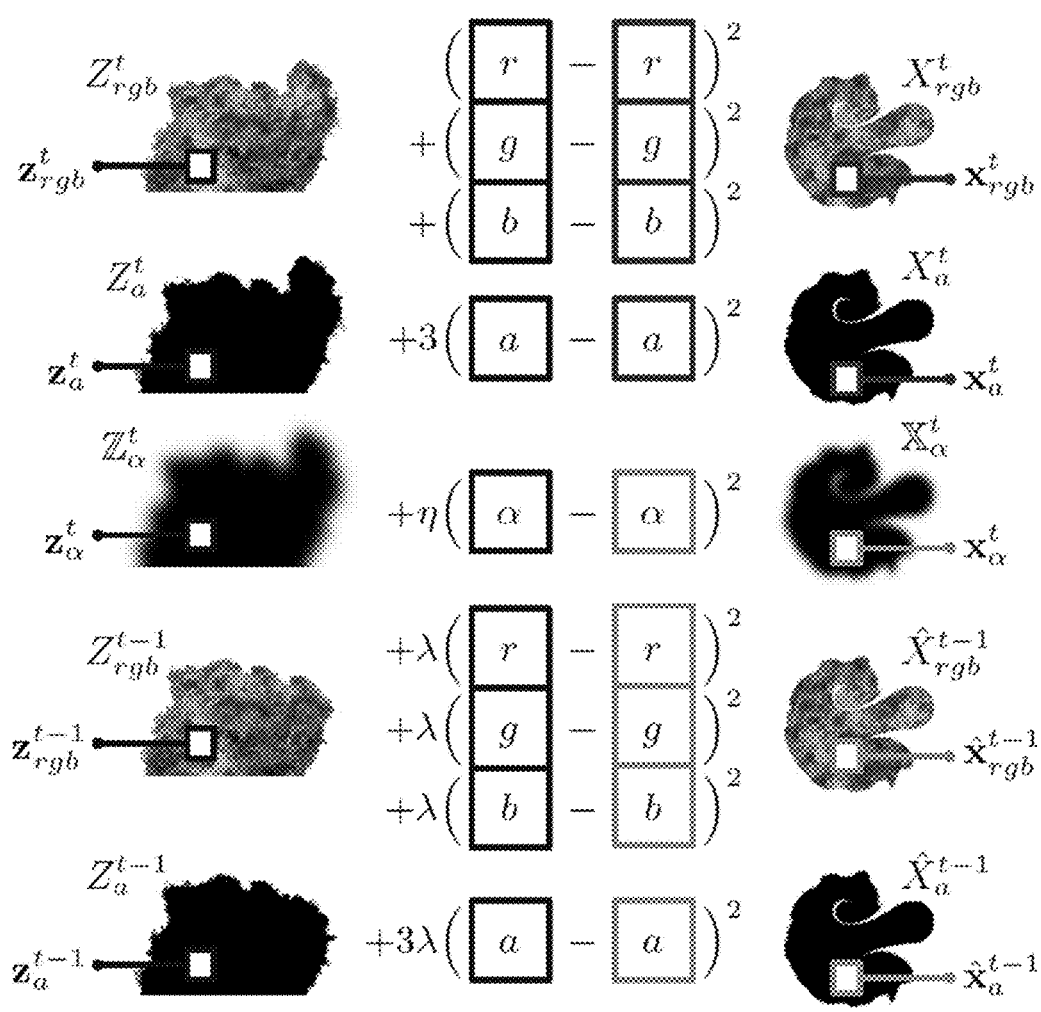
FIG. 9 illustrate additional channels that are concatenated to form an enriched source and target to support appearance transfer.

The functionality described in the section above are formally combined into one joint optimization problem in this section. Each of the additional channels are concatenated to form a new enriched source $\tilde{Z} = (Z^t, \mathbb{Z}_\alpha^t, Z^{t-1})$ and new enriched target $\tilde{X} = (X^t, \mathbb{X}_\alpha^t, \hat{X}^{t-1})$ as shown in an example implementation of FIG. 9. The aim of the following is to minimize the following energy:

$$E_S(\tilde{Z}, \tilde{X}, \lambda, \eta) = \sum_{p \in \tilde{X}} \min_{q \in \tilde{Z}} D(\tilde{Z}_p, \tilde{X}_q, \lambda_q, \eta)$$

subject to the uniformity constraint above. Here $\lambda_q$ is the spatially variant weight for temporal coherence, $\eta$ is the weight for boundary coherence, and $\tilde{x}$ and $\tilde{z}$ denote patches with nine channels per pixel:

$$\tilde{X} = (X_{rgb}^t, X_a^t, X_\alpha^t, \hat{X}_{rgb}^{t-1}, \hat{X}_a^{t-1})$$

$$\tilde{Z} = (Z_{rgb}^t, Z_a^t, Z_\alpha^t, Z_{rgb}^{t-1}, Z_a^{t-1})$$

where $x_{rgb}^t$ denotes the color and $x_a^t$ the alpha mask of the currently synthesized frame, $x_\alpha^t$, is the blurred alpha mask of the current frame, $\hat{x}_{rgb}^{t-1}$ is the color and $\hat{X}_a^{t-1}$ the alpha mask of the previous frame (likewise for $\tilde{z}$). Finally D is the distance measure between patches $\tilde{x}$ and $\tilde{z}$ as shown in FIG. 9:

$$D(\tilde{Z}, \tilde{X}, \lambda, \eta) = \|Z_{rgb}^t - X_{rgb}^t\|^2 +$$
$$3\|Z_a^t - X_a^t\|^2 +$$
$$\eta\|Z_\alpha^t - X_\alpha^t\|^2 +$$
$$\lambda\|Z_{rgb}^{t-1} - \hat{X}_{rgb}^{t-1}\|^2 +$$
$$3\lambda\|Z_a^{t-1} - \hat{X}_a^{t-1}\|^2$$

To minimize the expression above, an energy and magnitude multi-scale technique is used. This technique includes a modification that the source and target patches contain pixels with 9 weighted channels (4 are synthesized and 5 are for guidance) and that the NNF retrieval phase is replaced by the techniques above to supporting uniform patch usage, e.g., search direction and patch usage counter. Temporal coherence is implicitly incorporated due to inclusion of the additional pixel channels, and thus additional modifications to control texture synthesis are not used. The first frame is synthesized with $\lambda=0$ and then a frame-by-frame order is followed.

Figure 10:
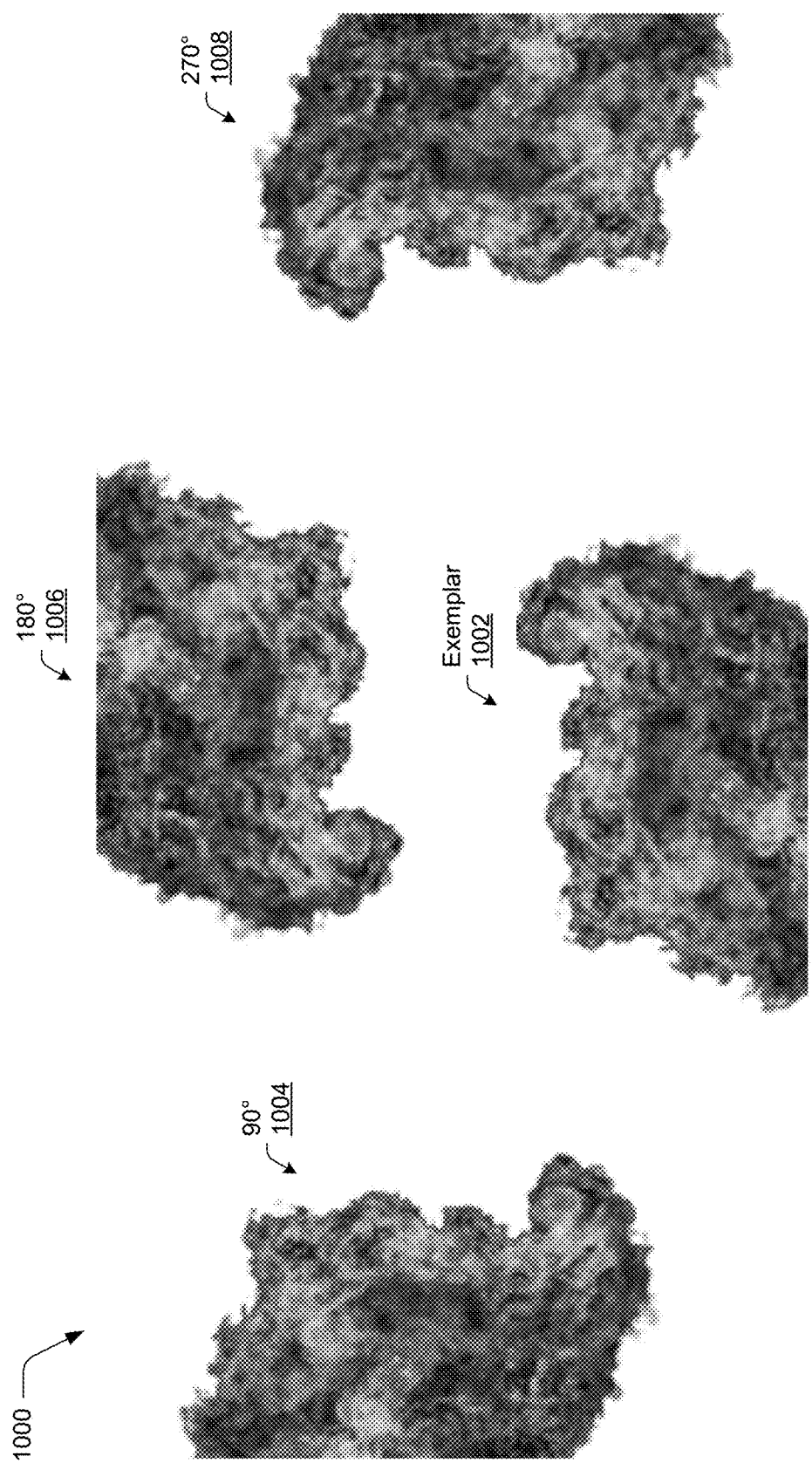
FIG. 10 illustrated an example in which an exemplar is rotated to provide additional patches as a source.

These techniques may also be extended to handle arbitrarily rotated patches by having the NNF retrieval phase look over the space of rotations in addition to translations. The patch counting mechanism and NNF construction remain unchanged. Although such an extension could improve the appearance on some specific flows (e.g., pure rotation) it can significantly increase the overall processing time. In practice, a simpler approximation with notably lower computational overhead may be used as shown in an example implementation of FIG. 10. In this example, an exemplar 1002 is pre-rotated by ninety degrees 1004, one hundred and eight degrees 1006, and two hundred and seventy degrees 1008 with synthesis performed using this enriched source.

Figure 11:
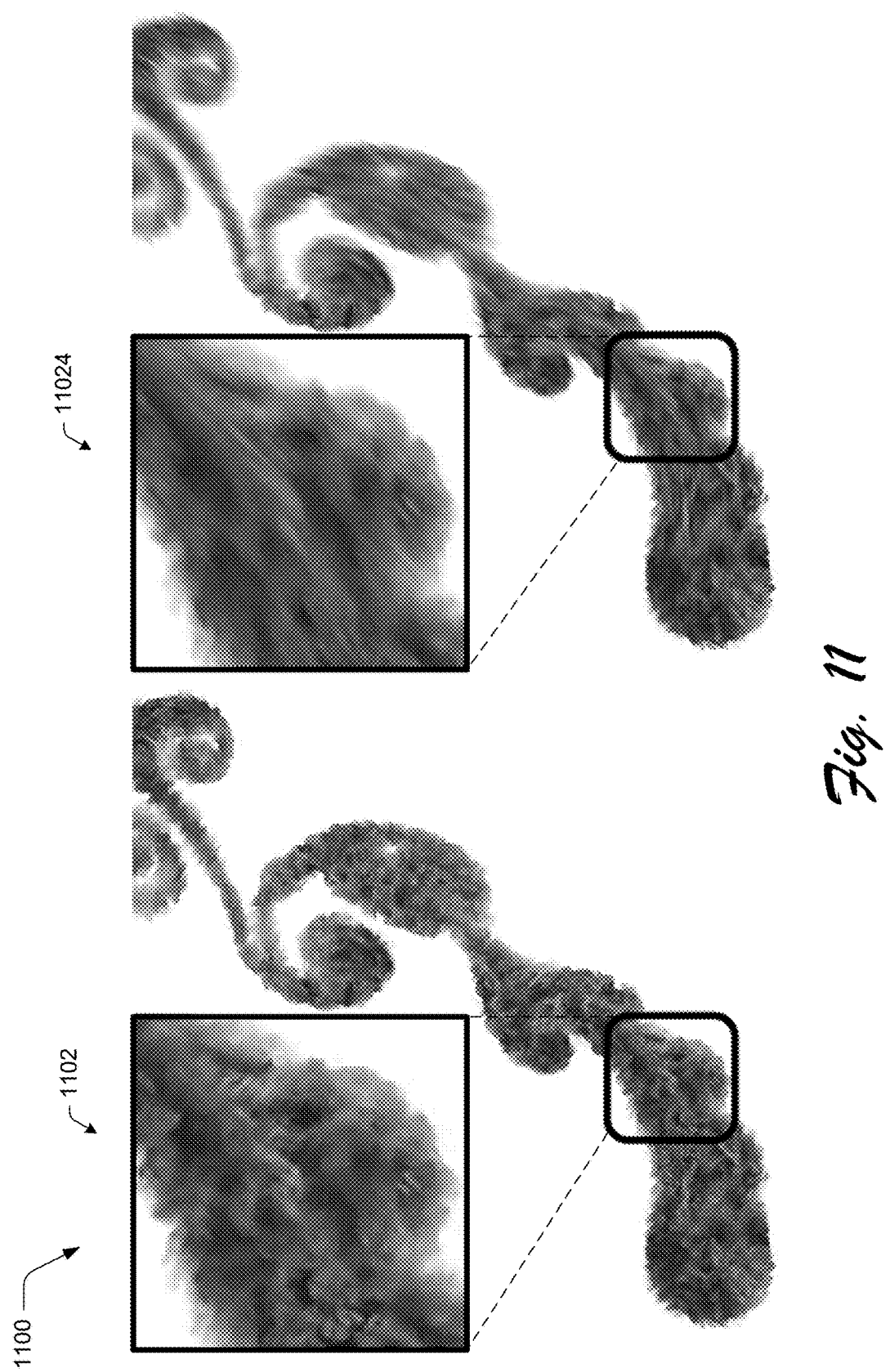
FIG. 11 depicts an example implementation in which a fidelity of the resulting animation is further improved using synthetic motion blur.

FIG. 11 depicts an example implementation 1100 in which a fidelity of the resulting animation is further improved using synthetic motion blur. This additional effect can be implemented through knowledge of the exact motion field of the target animation being used. An anisotropic Gaussian filter is used to form a line convection in a direction and length given by the target motion field is then performed to supply the appearance of motion through use of the synthetic motion blur as shown in the figure through before and after images 1102, 1104. Further discussion of these and other examples is included in the following section.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-11.

Figure 12:
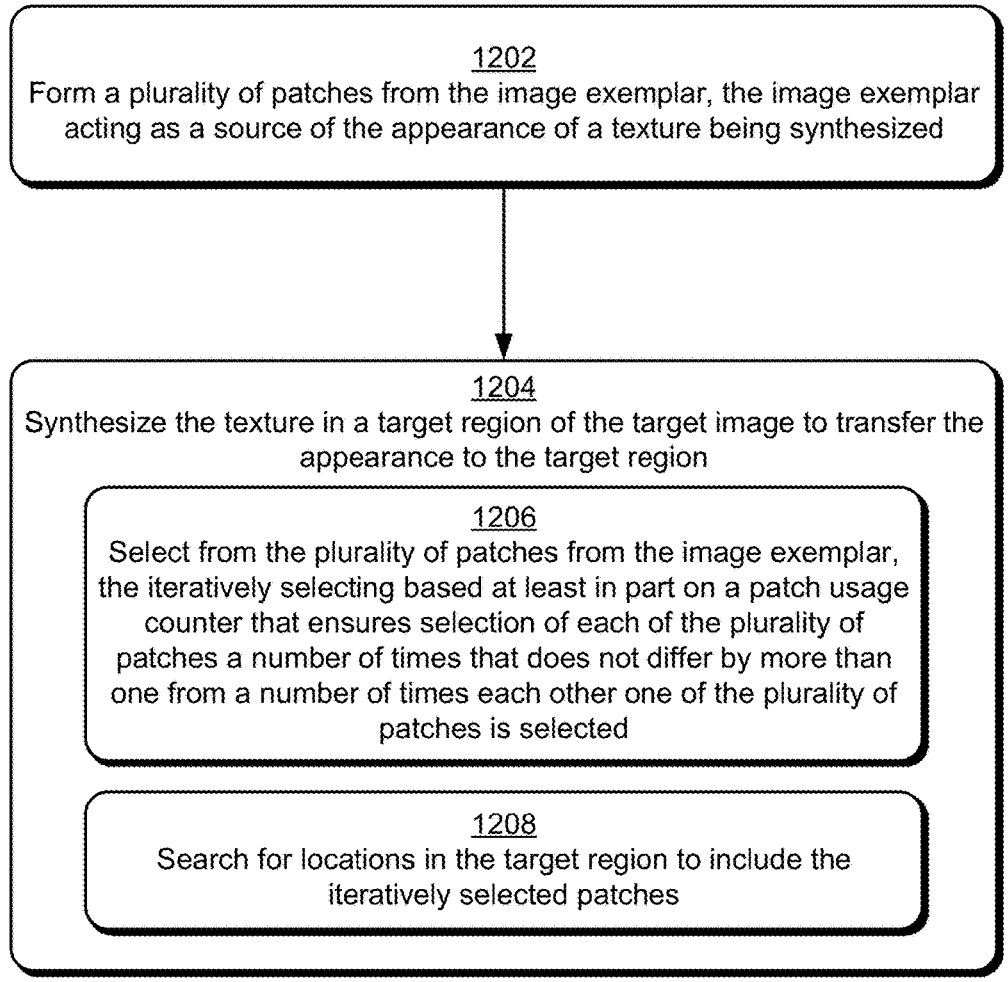
FIG. 12 is a flow diagram depicting a procedure in an example implementation in which a search and vote process is performed.

FIG. 12 depicts a procedure 1200 in an example implementation in which a search and vote process is performed as part of a texture synthesis in which patches are selected from an image exemplar and then a location if found in a target region of a target image. A plurality of patches is formed from an image exemplar, the image exemplar acting as a source of the appearance of a texture being synthesized (block 1202). The image exemplar 112, for instance, may be configured as a static image, as one of a plurality of frames as part of a video exemplar, and so on. The image exemplar 112 may be configured in a variety of ways to provide an appearance that is to be transferred to another image, e.g., a fluid (e.g., fire, smoke, water, lava) or non-fluid such as woodgrain.

The text in a target region of a target image is synthesized to transfer the appearance to the target region (block 1204). The target region, for instance, may be specified using an alpha mask to define which portion of the target image is to receive the transfer of appearance through texture synthesis.

As part of the transfer, selection is made from the plurality of patches from the image exemplar, e.g., which may iterate over a plurality of selections of individual ones of the patches. The selection is based at least in part on a patch usage counter that ensures selection of each of the plurality of patches a number of times that does not differ by more than one form a number of times each other one of the plurality of patches is selected (block 1206). As shown in FIGS. 4 and 5, for instance, the patch usage counter 302 is used by the search module 204 to ensure each of the patches from the image exemplar 112 is used a number of times that is within one of each other.

The search module 204 then searches for location in the target region to include the iteratively selected patches (block 1208), which may also iterate responsive to selection of the patches. Thus, in this example a direction of search is also reversed as compared to conventional techniques in which in this example patches are selected from the image exemplar 112 and then a location is found. This technique is also performable without using a patch usage counter 302 while still promoting use of dynamic patches as part of patch synthesis.

Figure 13:
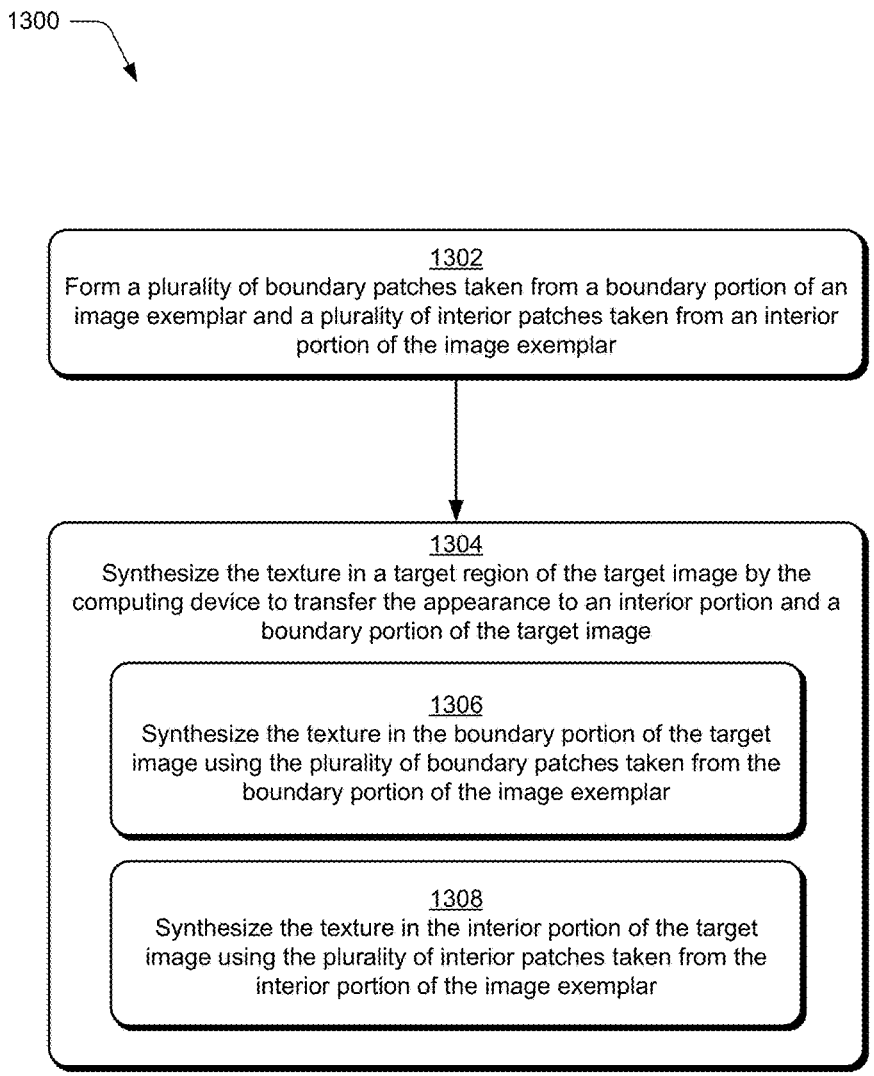
FIG. 13 is a flow diagram depicting a procedure in an example implementation in which a patching matching technique is employed.

FIG. 13 depicts a procedure 1300 in an example implementation in which a patching matching technique is employed that distinguishes between interior and border portions of image exemplars and target region in a target image. A plurality of boundary patches is formed that are taken from a boundary portion of an image exemplar. A plurality of interior patches is also formed that are taken from an interior portion of the image exemplar (block 1302). As shown in FIG. 6, for instance, border and interior regions 610, 612 of an image exemplar 112 and border and interior regions 614, 616 of a target region 212 may be identified by blurring respective alpha masks and using thresholds.

The texture is synthesized in the boundary portion of the target image using the plurality of boundary patches taken from the boundary portion of the image exemplar (block 1306), e.g., through a search and vote process. Likewise, the texture is synthesized in the interior portion of the target image using the plurality of boundary patches taken from the interior portion of the image exemplar (block 1308), which may also be performed using a search and vote process. In this way, a distinction is made between sources and targets as part of appearance transfer. This technique is also combinable with the previous techniques, e.g., search direction and patch usage counters, to promote appearance transfer with increased realism over conventional techniques.

FIG. 14 depicts a procedure 1400 in an example implementation in which a video exemplar is used along with a warped previous frame of a target video to synthesize texture in a particular frame of the target video. In this example, frames in a target video are synthesized using frames in a video exemplar (block 1402), e.g., using a motion field as described above. These techniques may incorporate the techniques described above, although with additional considerations given to temporal coherence.

As part of this, a previous frame of the target video is synthesized that occurs in a sequence of the target video before a particular frame being synthesized (block 1404). The texture in a particular frame of the target video is then synthesized to synthesize color in the particular frame from a corresponding frame of the video exemplar as guided by a flow indicated in the warped previous frame of the target video (block 1406), e.g., using a search and vote process. In this way, consistent motion between the previous and particular frames in the target video is achieved with rich color taken from a corresponding frame of the video exemplar.

FIG. 15 depicts a procedure 1500 in an example implementation in which an emitter portion is identified and an influence of which is reduced as part of a patch match process to synthesize a texture as part of appearance transfer. In this example, frames in a target video are also synthesized using frames in a video exemplar (block 1502), but in this instance an emitter portion of a particular frame is addressed.

An emitter portion is identified in a particular frame of the target video being synthesized, the emitter portion is added to a target region from a previous frame of the target video that occurs in a sequence of the target video before the particular frame (block 1504). A jet of flame, for instance, may expand and move from one frame to the next in the target video. Thus, this expansion is identified as an emitter portion and addressed as follows.

Texture is synthesized in the particular frame of the target vide, the synthesis includes synthesizing color in the particular frame from a corresponding frame of the video exemplar as guided by a flow indicated in the warped previous frame of the target video by reducing an effect of the identified emitted portion of the particular frame on the search (block 1506), e.g., as part of a search and vote process. In this way, rich and dynamic appearance of the emitter portion is achieved, unlike conventional techniques as previously described in which such portions would wash out due to influence of the emitter portion in selection of patches. A variety of other examples are also contemplated.

Example System and Device

Figure 16:
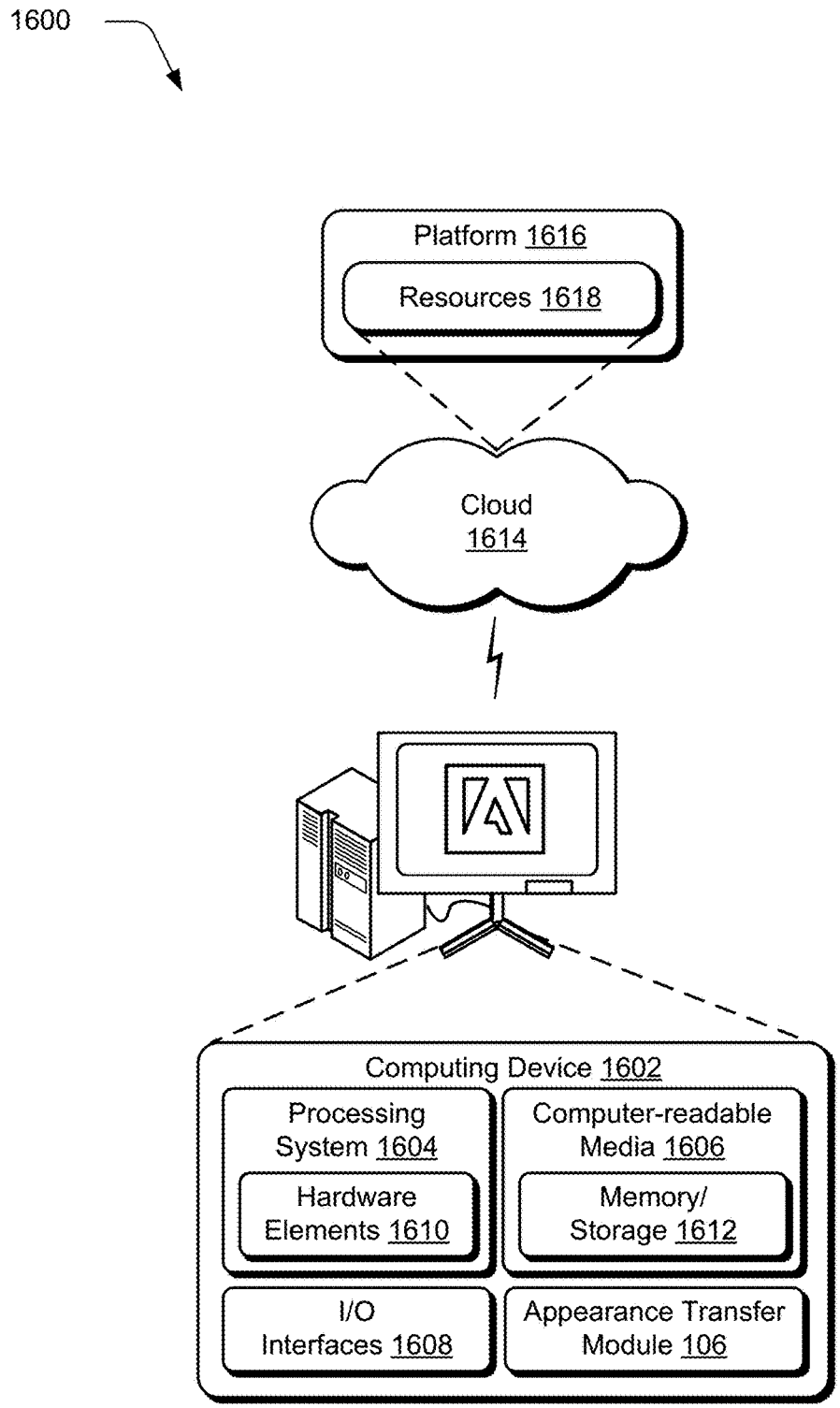
FIG. 16 illustrates an example system including various components of an example device that can be implemented as any type of computing device as described and/or utilize with reference to FIGS. 1-15 to implement embodiments of the techniques described herein.

FIG. 16 illustrates an example system generally at 1600 that includes an example computing device 1602 that is representative of one or more computing systems and/or devices that may implement the various techniques described herein. This is illustrated through inclusion of the appearance transfer module 106. The computing device 1602 may be, for example, a server of a service provider, a device associated with a client (e.g., a client device), an on-chip system, and/or any other suitable computing device or computing system.

The example computing device 1602 as illustrated includes a processing system 1604, one or more computer-readable media 1606, and one or more I/O interface 1608 that are communicatively coupled, one to another. Although not shown, the computing device 1602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1604 is representative of functionality to perform one or more operations using hardware. Accordingly, the processing system 1604 is illustrated as including hardware element 1610 that may be configured as processors, functional blocks, and so forth. This may include implementation in hardware as an application specific integrated circuit or other logic device formed using one or more semiconductors. The hardware elements 1610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1606 is illustrated as including memory/storage 1612. The memory/storage 1612 represents memory/storage capacity associated with one or more computer-readable media. The memory/storage component 1612 may include volatile media (such as random access memory (RAM)) and/or nonvolatile media (such as read only memory (ROM), Flash memory, optical disks, magnetic disks, and so forth). The memory/storage component 1612 may include fixed media (e.g., RAM, ROM, a fixed hard drive, and so on) as well as removable media (e.g., Flash memory, a removable hard drive, an optical disc, and so forth). The computer-readable media 1606 may be configured in a variety of other ways as further described below.

Input/output interface(s) 1608 are representative of functionality to allow a user to enter commands and information to computing device 1602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1610 and computer-readable media 1606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1610. The computing device 1602 may be configured to implement particular instructions and/or functions corresponding to the software and/or hardware modules. Accordingly, implementation of a module that is executable by the computing device 1602 as software may be achieved at least partially in hardware, e.g., through use of computer-readable storage media and/or hardware elements 1610 of the processing system 1604. The instructions and/or functions may be executable/operable by one or more articles of manufacture (for example, one or more computing devices 1602 and/or processing systems 1604) to implement techniques, modules, and examples described herein.

The techniques described herein may be supported by various configurations of the computing device 1602 and are not limited to the specific examples of the techniques described herein. This functionality may also be implemented all or in part through use of a distributed system, such as over a "cloud" 1614 via a platform 1616 as described below.

The cloud 1614 includes and/or is representative of a platform 1616 for resources 1618. The platform 1616 abstracts underlying functionality of hardware (e.g., servers) and software resources of the cloud 1614. The resources 1618 may include applications and/or data that can be utilized while computer processing is executed on servers that are remote from the computing device 1602. Resources 1618 can also include services provided over the Internet and/or through a subscriber network, such as a cellular or Wi-Fi network.

The platform 1616 may abstract resources and functions to connect the computing device 1602 with other computing devices. The platform 1616 may also serve to abstract scaling of resources to provide a corresponding level of scale to encountered demand for the resources 1618 that are implemented via the platform 1616. Accordingly, in an interconnected device embodiment, implementation of functionality described herein may be distributed throughout the system 1600. For example, the functionality may be implemented in part on the computing device 1602 as well as via the platform 1616 that abstracts the functionality of the cloud 1614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   forming, by a computing device, a plurality of patches from an image exemplar, the image exemplar acting as a source of an appearance of a texture; and
   synthesizing, by the computing device, the texture in a target region of a target image to transfer the appearance to the target region, the synthesizing including:
      selecting from the plurality of patches from the image exemplar, the selecting using a patch usage counter ensuring selection of each patch of the plurality of patches a number of times that does not differ by more than one from a number of times each other patch of the plurality of patches is selected; and
      searching for locations in the target region to include the selected patches.

2. The method as described in claim 1, wherein the synthesizing further comprises generating values for each of the pixels in the target region using a voting process regarding the selected patches that overlap each said pixel.

3. The method as described in claim 1, wherein the selecting includes using each of the plurality of patches formed from the image exemplar in the target region at least once when the target region is larger than the image exemplar.

4. The method as described in claim 1, wherein the synthesizing includes repeating the selecting and the searching for individual patches of the plurality of patches.

5. The method as described in claim 1, wherein:
   the selecting is based at least in part on a motion field that corresponds to a target alpha mask that defines the target region in the target image; and
   the target image is one of a plurality of images that form a target video.

6. The method as described in claim 1, wherein:
   the image exemplar is one of a plurality of frames of a video exemplar;
   the target image is one of a plurality of frames of a target video; and
   the forming and the synthesizing are performed for the plurality of frames of the target video.

7. The method as described in claim 6, wherein the synthesizing is based at least in part on a warped version of a previous frame of the plurality of frames of the video exemplar.

8. The method as described in claim 7, wherein the warped version is generated using a motion field.

9. The method as described in claim 1, wherein:
   the forming includes forming a plurality of boundary said patches taken from a boundary portion of the image exemplar and forming a plurality of interior said patches taken from an interior portion of the image exemplar; and
   the synthesizing includes synthesizing an interior portion of the target region of the target image using the plurality of interior said patches and synthesizing a boundary portion of the target region of the target image using the plurality of boundary said patches.

10. A method comprising:
    receiving, by the computing device, a target image having a target region;
    identifying, by the computing device, an interior portion and a boundary portion of the target region;
    forming, by the computing device, a plurality of boundary patches taken from a boundary portion of an image exemplar and a plurality of interior patches taken from an interior portion of the image exemplar; and
    synthesizing, by the computing device, the texture in the target region of the target image to transfer an appearance to the interior portion and the boundary portion of the target image, the synthesizing including:
       synthesizing the texture in the boundary portion of the target image using the plurality of boundary patches taken from the boundary portion of the image exemplar; and
       synthesizing the texture in the interior portion of the target image using the plurality of interior patches taken from the interior portion of the image exemplar.

11. The method as described in claim 10, wherein the forming includes identifying the interior portion and the boundary portion of the image exemplar by:
    blurring an alpha mask of the image exemplar; and
    distinguishing between the interior portion and the boundary portion using an opacity threshold for individual pixels of the blurred alpha mask of the image exemplar.

12. The method as described in claim 11, wherein the forming further comprises using another opacity threshold to define a boundary of the boundary portion of the image exemplar.

13. The method as described in claim 10, wherein the forming includes identifying the interior portion and the boundary portion of the target region of the target image by:
    blurring an alpha mask of the target region; and
    distinguishing between the interior portion and the boundary portion using an opacity threshold for individual pixels of the blurred alpha mask of the target region.

14. The method as described in claim 13, wherein the forming further comprises using another opacity threshold to define a boundary of the boundary portion of the target region.

15. The method as described in claim 10, wherein synthesizing of the texture in the boundary and interior portions includes using a respective patch usage counter.

16. A system comprising:
    a patch synthesis module implemented at least partially in hardware to synthesize a texture in a target region of a target image, the patch synthesis module configured to select patches from a plurality of patches of an image exemplar based at least in part on a patch usage counter to ensure selection of each said patch of the plurality of patches a number of times that does not differ by more than one from a number of times each other said patch of the plurality of patches is selected; and
    the patch usage counter maintained at least partially in the hardware to store the number of times each said patch of the plurality of patches is selected for use in synthesizing a texture in the target image.

17. The system as described in claim 16, wherein the patch synthesis module is configured to generate values for each of the pixels in the target region using a voting process to define a contribution of the selected patches that overlap each said pixel.

18. The system as described in claim 16, wherein the patch synthesis module is configured to use each of the plurality of patches formed from the image exemplar in the target region at least once when the target region is larger than the image exemplar.

19. The system as described in claim 16, wherein the patch synthesis module is configured to perform the selection based at least in part on a motion field that corresponds to a target alpha mask that defines the target region in the target image.

20. The system as described in claim 16, wherein the patch synthesis module is configured to:
   form a plurality of boundary said patches taken from a boundary portion of the image exemplar and form a plurality of interior said patches taken from an interior portion of the image exemplar; and
   synthesize an interior portion of the target region of the target image using the plurality of interior said patches and synthesize a boundary portion of the target region of the target image using the plurality of boundary said patches.

\* \* \* \* \*